Dec. 28, 1948.  C. W. MALIPHANT  2,457,578
CHOKE FITTING
Filed May 31, 1944

INVENTOR.
CHARLES W. MALIPHANT
BY
ATTORNEY

Patented Dec. 28, 1948

2,457,578

UNITED STATES PATENT OFFICE 2,457,578

CHOKE FITTING

Charles W. Maliphant, Wilmerding, Pa., assignor to The Westinghouse Air Brake Company, Wilmerding, Pa., a corporation of Pennsylvania Application May 31, 1944, Serial No. 538,178

1 Claim. (Cl. 138—41)

This invention relates to a fluid strainer construction of the type to be used in a fluid conducting passage of a fluid pressure controlled apparatus.

An object of this invention is to provide an improved choke plug arranged for use in a fluid conducting passage and having associated therewith fluid straining or cleaning means which operates to remove foreign matter from the fluid flowing through the passage immediately before the fluid reaches the choked port in the plug.

A further object of the invention is to provide an improved choke plug of the above type in which a fibrous fluid straining means is employed that has a large surface area exposed to fluid to be cleansed in order to prevent clogging of the fluid straining means and resultant restriction of the flow of fluid therethrough to the choked port in the plug by collected foreign matter separated from the fluid.

Another object is to provide an improved choke plug of the type described in the preceding paragraph having means whereby the fibrous fluid cleansing material is so supported that it will be maintained spaced away from the choked port a sufficient distance that it will not restrict the flow of fluid through the port in the choke plug.

A further object is to provide a choke plug having simple but very effective means for mounting and removably securing the straining element therein.

Figure 1:
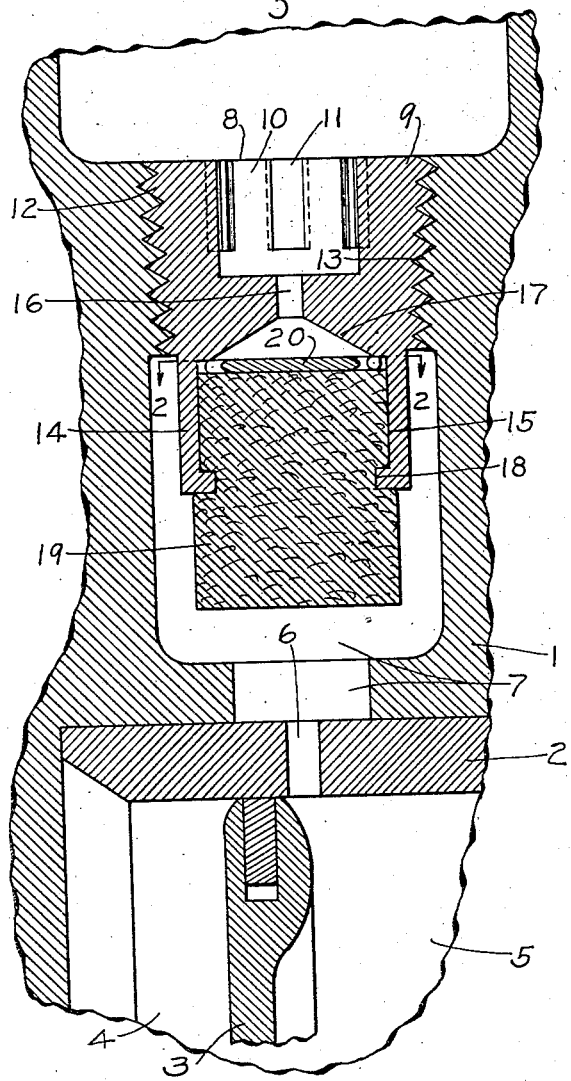
Figure 2:
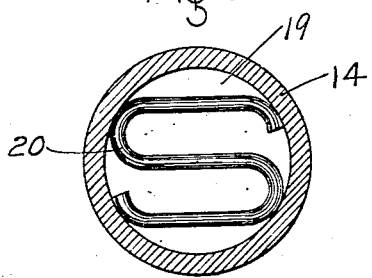

Other objects of the invention and features of novelty will be apparent from the following description taken in connection with the accompanying drawing, in which Fig. 1 is a fragmentary sectional view of an improved brake controlling valve device embodying the invention, and Fig. 2 is a detail cross-sectional view taken on the line 2—2 of Fig. 1.

Referring to the drawing, there is illustrated therein a fragment of the emergency portion of a brake controlling valve device of the type shown and described in U. S. Patent No. 2,031,213, issued February 18, 1936, to C. C. Farmer. The emergency portion comprises a body 1 having a bore therein in which is positioned a bushing 2 which has mounted therein a piston 3 having at one face a chamber 4 which is constantly connected to brake pipe, not shown, by means of a communication having an air strainer, not shown, interposed therein. Piston 3 has at its other face a valve chamber 5 which is constantly connected to a quick action chamber formed in a pipe bracket section, not shown.

The piston 3 is reciprocable in the bushing 2 and at one point in its range of movement opens communication from the chamber 4 to a port 6 in a bushing 2 which communicates with a passage or conductor 7 in the body 1 through which fluid under pressure is supplied from the brake pipe to the valve chamber 5 and to the quick action chamber.

The passage 7 in the body 1 has a choke plug, indicated by the reference numeral 8, mounted therein to control the flow of fluid from the brake pipe to the valve chamber 5 and to the quick action chamber.

As shown in the drawing, choke plug 8 comprises a body 9 which may be formed of any suitable material such as brass. Formed in the top portion of the body 9 as viewed in the drawing is an annular recess 10 having in its peripheral wall a plurality of splines 11 for engagement by a spline wrench. The lateral exterior surface of this portion of the body 9 is provided with tapered threads 12 for engaging corresponding threads 13 formed in the wall of the passage 7. The lower end of the body terminates in a cylindrical portion 14 of slightly smaller diameter than the adjacent threaded portion.

Located in the cylindrical portion 14 in coaxial relation to the body 9 is a bore 15 which is open to the recess 10 by way of an axial restricted port or passage 16. For a short distance one end of this bore tapers inwardly to the adjacent open end of the passage 16 and where the surface of this end of the bore merges into the surface of that portion of the bore which has the greatest diameter, the tapering surface serves as an annular ledge or slot for a member which will be described later herein. At the other end of this bore the portion 14 of the body 9 is provided with an inwardly extending relatively thin narrow annular flange 18 having an inner diameter slightly smaller than that of the bore.

Associated with the body 9 is a fluid straining element 19 which may be formed of any suitable material, but preferably of a compacted fibrous material such as felt, in a cylindrical body of slightly larger diameter than that of the bore 15. This felt body may be inserted in the bore 15 of the cylindrical portion 14, and being of slightly larger diameter than the bore, will be compressed somewhat when inserted therein so that it is held in firm engagement with the surface of the bore and with the inner periphery of the flange 18 by the inherent resiliency of the material of which it is constructed. Interposed between the straining element 19 and the conical surface 17 of the bore 15 is a retaining or seat member 20 which may consist of a metallic wire formed in the general shape of a letter S. This member 20 serves as a retainer or stop to prevent the strainer element 19 from engaging the conical surface 17, thus at all times insuring the maintainance of an unoccupied chamber between the air straining element and the adjacent open end of the restricted passage 16. From this it will be obvious that the straining element cannot be accidentally forced into the tapering portion of the bore 15 thereby effectively eliminating any possibility of the clogging of the choke passage 16 by the element.

It is intended that the air straining element 19 be readily insertable in the body 9 of the choke plug, and that when it is in position, that it be firmly held in such position. For instance, a downward pull on the straining element will cause that portion of the element which is above the shoulder to jam at the shoulder and thereby offer resistance to downward movement.

It should be understood that the parts of this strainer construction are to be so proportioned in relation to the passage 7 in which it is mounted that the straining element will be spaced away from the walls of the passage so that there will always be a clear space exteriorly of the exposed portion of the element.

In the service for which this invention is intended, the flow of fluid to the passage in which the strainer is mounted is normally in one direction only, and therefore, as shown in the drawing the strainer is arranged so that when fluid flows through the port 6 in the bushing 2 to the passage 7, it will then flow through the air straining element 19 before reaching restricted passage 16 which is to be protected. If the fluid supplied to the passage 7 contains any foreign matter, it will be removed by the straining element 19 before reaching the restricted passage 16 in the choke plug 8 where it might partially or completely close the passage, thereby interfering with the intended operation of the valve device. Thus the flow of fluid to the choke plug is through the straining element 19 into the body 9 of the choke plug, and therefore there will be no tendency of dislodgement of this element by this flow of fluid, the tendency of such flow being to seat the element more firmly on the seat member 20.

It should here be noted that if that end portion of the straining element which is contained in the bore 15 could be forced into the tapered portion of the bore it would tend to restrict the flow of fluid through the element. Since, however, the seat member prevents the element from engaging the tapering surface 17 the end of the element maintains its large flow area and thus insures the free flow of fluid from the element to the port 16.

Having now described my invention, what I claim as new and desire to secure by Letters Patent, is:

A removable choke plug comprising a body having a fluid flow restricting bore open to one end of said body, an axial bore of larger diameter connecting said restricting bore to the opposite end of said body to permit flow of fluid in the direction from said larger bore to said restricting bore, said body comprising at the outer end of said larger bore an inwardly directed annular flange, and a removable compressible filter element comprising a portion disposed in said larger bore, a portion disposed outside said body beyond said opposite end, and an intermediate portion disposed within and compressed by said annular flange for removably holding said filter element in said body.

CHARLES W. MALIPHANT.

REFERENCES CITED

The following references are of record in the file of this patent:

UNITED STATES PATENTS

| Number | Name | Date |
|---|---|---|
| 439,091 | Bach | Oct. 28, 1890 |
| 1,496,947 | Robinson | June 10, 1924 |
| 1,862,482 | Kocher | June 7, 1932 |
| 1,994,460 | Bijur | Mar. 19, 1935 |

FOREIGN PATENTS

| Number | Country | Date |
|---|---|---|
| 79,774 | Germany | Apr. 10, 1894 |